United States Patent [19]

Rogers et al.

[11] Patent Number: 4,892,846
[45] Date of Patent: Jan. 9, 1990

[54] REINFORCEABLE SINTERED GLASS-CERAMICS

[75] Inventors: Philip S. Rogers, Rickmansworth; Rees D. Rawlings, Kingston-upon-Thames; Hyung S. Kim, London, all of England

[73] Assignee: National Research Development Corporation, London, England

[21] Appl. No.: 272,343

[22] Filed: Nov. 17, 1988

[51] Int. Cl.$^4$ .................. C03C 10/04; C03C 10/06
[52] U.S. Cl. ................................. 501/8; 501/5; 501/69; 501/71; 501/73; 501/95
[58] Field of Search ............... 501/5, 8, 69, 71, 73, 501/95

[56] References Cited

U.S. PATENT DOCUMENTS 3,901,716  8/1975  Rogers et al. ............... 501/70 X
4,615,987  10/1986  Chyung et al. ..................... 501/8
4,769,346  9/1988  Gadkaree et al. ................ 501/8 X Primary Examiner—Mark L. Bell
Assistant Examiner—Karl Group
Attorney, Agent, or Firm—Nixon & Vanderhye

[57] ABSTRACT

A fibre-reinforced ceramic material is made by making a melt of glass of specified composition, cooling the melt rapidly enough for it to solidify as a glass, crushing the glass to a particle size not exceeding 70 μm but preferably not exceeding 50 μm mixing the powder with reinforcing fibres and heat-treating the mixture, preferably under pressure. The glass composition is: 100 parts by weight of base glass (0–30 CaO, 0–30 MgO, 5–35 $Al_2O_3$, and 35–75 $SiO_2$) plus ½–3 parts $Cr_2O_3$ plus ½–10 parts of $Fe_2O_3$ or the equivalent.

This ensures the ceramic contains both surface-nucleated and internally-nucleated crystals, enhancing its properties.

11 Claims, No Drawings

REINFORCEABLE SINTERED GLASS-CERAMICS

FIELD OF THE INVENTION

This invention relates to sintered glass-ceramics and to a method of making them, especially when they are reinforced with a dispersed phase such as particles or fibers.

DESCRIPTION OF THE PRIOR ART

A glass-ceramic taught in U.S. Pat. No. 3,901,716 to P. S. Rogers et al comprises a base glass being 20 wt % CaO, 14% MgO, 10% $Al_2O_3$ plus 56% $SiO_2$, plus (additionally to the 100%) 2% $Cr_2O_3$, 3% $Fe_2O_3$ and 3% $Na_2O$. Equivalent hydrates or carbonates could be used as convenient. This is melted and cooled (without reheating) at such a rate that crystals are formed within the melt and grow until the whole is a solid crystalline mass. (The composition, if cooled rapidly, would solidify as a normal amorphous glass.) The preferential nucleation of crystals in this material is within the bulk of the melt and not at the surface.

This material is inexpensive, erosion resistant, hard and impermeable. Nonetheless, in common with glass-ceramics generally, mechanical failure is sudden and fully catastrophic. i.e. there is far less warning of impending failure than with metals, where plastic deformation precedes failure.

SUMMARY OF THE INVENTION

An attractive possibility for increasing the fracture toughness of a ceramic, and of changing the failure mode to one which is not fully catastrophic, is to incorporate a dispersion of another phase such as particles or preferably fibers, within a matrix comprising the ceramic. For reasons such as superior mechanical properties to glasses and lower temperatures for fabrication than oxide ceramics, glass-ceramics are among the main contenders for such matrix materials. Glass-ceramic composites may be produced by cold pressing and firing, or by hot pressing, a mixture of a powder of the parent glass and the particles or fibers. During the firing or hot pressing, or during a subsequent heat-treatment, the parent glass crystallises to give a fine-grained glass-ceramic. The conventional process for making glass-ceramics is by melting, casting and heat-treatment for crystallisation and results in a monolithic (or bulk) product, referred to later on as 'cast glass-ceramic'. The incorporation of fibers in such a material would therefore involve exposure of the fiber to a silicate melt, with disadvantages such as chemical aggression and difficulty in mixing. The use of glass powder, with subsequent heat-treatment below the melting temperature, substantially avoids the problems associated with the conventional route.

According to the present invention, a reinforceable ceramic material is made by first forming a homogeneous amorphous glass powder of specified composition and of a particle size not exceeding 70 μm, preferably not exceeding 50 μm. This can be done, for example, by making a melt of glass of the specified composition, cooling the melt rapidly enough for it to solidify as a glass, during or after the cooling comminuting the glass (e.g. by granulating by pouring into quenching liquid, or by crushing) or by sol-gel, forming the glass to the said particle size). The powder so produced is then optionally mixed with a reinforcing engineering ceramic such as particles or fibers. The powder or mixture so produced is heated so as to sinter and crystallise it in the same heating, preferably under pressure.

A "particle size not exceeding x" means that 95 weight % of the particles do not exceed x, throughout this specification and its claims.

The glass composition is: 100 parts by weight of base glass (0-30 CaO, 0-30 MgO, 5-35 $Al_2O_3$ and 35-75 $SiO_2$) plus ½-3 parts $Cr_2O_3$ (or the equivalent if using a precursor of $Cr_2O_3$ such as a chromate) plus ½-10 parts of $Fe_2O_3$ or the equivalent. Using this glass composition for making the glass-ceramic matrix during heat-treatment, the powder has a sufficiently low viscosity in the early stages of the heat-treatment to avoid damaging fibers when compressed and subjected to bending stresses by contact with hard particles. The hard particles of oxide ceramic or other components for producing other glass-ceramics can cause break-up of the fiber component during pressing and/or firing.

DESCRIPTION OF THE PREFERRED EMBODIMENT

The invention will now be described by way of example with reference to the example, following some general introductory remarks.

Currently there is considerable interest in ceramic matrix composites due to their potentially superior mechanical properties. In particular, ceramic matrix-fiber composites can exhibit much improved toughness compared to the monolithic matrix material. Oxide ceramics, non-oxide ceramics, glass and glass-ceramics are all under consideration as matrix materials, the choice of matrix depending on such factors as cost and required mechanical properties.

A number of production routes are available for composites including sintering. There are two possibilities for the production of a glass-ceramic matrix composite by cold pressing and sintering, namely the sintering of particulate glass-ceramic with appropriate fibers or particles or the sintering of powdered parent-glass and fibers or particles followed by a crystallisation treatment. The latter technique is preferable as lower sintering temperatures are required. Furthermore, by careful choice of the glass composition, glass particle size, and the sintering conditions it is possible to both sinter and crystallise in a single operation. A third sintering method is hot pressing the glass+(fiber/particle) mixture and again, ideally, the conditions would be selected to achieve both sintering and crystallisation during pressing.

EXPERIMENTAL PROCEDURE

Preparation of powder and compacts

Starting material of composition by wt. %: 20.2 CaO; 5.9 MgO. 12.6 $Al_2O_3$; 53.1 $SiO_2$; 0.8 $Cr_2O_3$; 4.6 $Fe_2O_3$; and 2.8 $Na_2O$ was used to make a glass by melting in a platinum crucible at 1450° C. for 1 hr and then cooling rapidly to room temperature by quenching the melt in water. It solidified to a non-crystalline structure.

Glass powder was produced by first crushing the glass in a percussion mortar and then grinding the crushed glass in a Tema mill. The glass powder was sieved with flowing water to yield a particle size under 38 μm. The wet powder was dried in an oven at 120° C. for 24 hours. The particle size distribution of the powder was subsequently determined using a laser diffraction method.

Both cold and hot pressing were used to produce compacts, the prepared powders were cold pressed, without any binder, in a 16.0 mm diameter steel die at various pressures up to 75 MPa. The green pellets were then heat-treated at temperatures in the range 850020 C. to 970° C. for 0, 0.5. 1, 2, and 3 hours followed by air cooling to room temperature. The hot pressing was carried out in a graphite die of bore diameter 12.7 mm or 34 mm at various pressures up to 6.9 MPa and at temperatures in the range 920° to 1100° C.

Differential thermal analysis and structure of compacts.

Differential thermal analysis (DTA) was carried out in static air on 50 mg samples of bulk and particulate glass with alumina as the reference material. Three powders were studied; (i) a fine grained powder (particle size not exceeding 38 μm). according to the invention (ii) for comparison a medium grained powder (particle size of 75–150 μm) and (iii) for comparison a coarse grained powder (particle size of 180–300 μm). Runs were performed at four different heating rates in the range 5 to 20° C./min from room temperature up to a maximum of 1200° C.

Sintering and Crystallisation.

The crystallisation of the coarse powders (and bulk glass) was associated with a single exothermic peak at a temperature of about 960° C. for a 10° C./min heating rate. In contrast. two exothermic peaks at temperatures of about 920° C. and 960° C. accompanied the crystallisation of the fine powder (i) according to the invention.

In specimens prepared by cold pressing and heating, surface nucleation and crystal growth always occurred, but, in general, did not prevent internal crystallisation. However, it was observed that internal crystallisation occurred more readily in the larger particles; furthermore the internal crystals tended to form in the central region of the particles with the result that, after certain heat treatments, a ring of residual glass separated these crystals from the surface nucleated crystals. This boundary region between the surface crystallisation and the crystals formed internally probably results from the increased resistance to crystallisation which follows changes in composition of the glass as crystallisation occurs. After long heat treatments, particularly at high temperatures, an additional crystalline phase was detected, which was more angular and had a larger aspect ratio than the primary crystal phase.

The hot pressed material also consisted of surface and internally nucleated crystals. The internal crystals were larger than the surface crystals but the mean crystal size was less than that found in slowly cooled monolithic, cast glass-ceramic. Due to flattening of the particles during hot pressing at the highest pressures (but not at 3.5 MPa), some layering of the microstructure could be discerned in sections parallel to the pressing axis, i.e. the regions of residual glass and surface crystallisation were elongated perpendicular to the pressing axis. The angular phase observed in some of the sintered cold pressed samples was also detected in the material hot pressed at the higher temperatures.

X-ray diffraction demonstrated that the primary crystalline phase in all of bulk crystallised, cold pressed and sintered, and in hot pressed samples was diopside. The angular crystals formed under certain conditions but only according to the invention, at the said regions of residual glass, were shown to be anorthite, present in at least 5 wt. % of the sample and typically 15–30 wt. % bulk crystallised samples yielded no anorthite under all normal conditions, and hence the presence of at least 5 wt. % anorthite may be considered characteristic of the invention.

For glasses in which surface nucleation predominates, the temperature of the exothermic crystallisation peak is strongly dependent on the surface area of the powder. In such cases, the finer the powder the lower the temperature of the peak. In contrast, in a glass with sufficient nuclei for internal crystallisation, such as the present invention, powder size will have little effect on the peak temperature. Thus the single exothermic peak at around 960° C. observed for the bulk glass and the coarse (>75μm) powders at the 10° C./min heating rate is indicative of the domination of internal crystallisation. However, for the very fine powder (<38 μm, according to the invention) the increasing propensity for surface crystallisation results in two overlapping peaks, of which the higher temperature peak, being close to 960° C., is thus attributed to internal crystallisation and the lower accordingly attributed to surface crystallisation.

Only for the finest powder investigated is surface crystallisation dominant. Thus by choice of powder size it will be possible to vary the proportions of internally and surface nucleated crystals in a sintered matrix. With appropriate control of porosity, the properties of a matrix with both are expected to be superior to those of cast monolithic glass-ceramic because the crystallites, whether internally or surface nucleated, are finer than the dendritic crystals in the cast material. Furthermore, the increased propensity for the formation of anorthite in the sintered material as opposed to cast glass-ceramic gives another controllable feature that may be beneficial.

Following this investigation into matrix material for use according to the invention, its behaviour under cold and hot pressing was investigated.

The fine powder, which consisted of particles of less than 38 μm, was used in a graphite die under vacuum to prepare hot pressed samples over a range of temperatures (900° C. to 950° C.) and times (20 to 120 minutes). The pressure was applied when a temperature of 750° C. was reached. The results described were obtained from 34 mm diameter samples produced at a pressure of 3.5 MPa.

Mechanical Testing

Bar specimens of nominal size 4 mm×4 mm×25 mm were cold pressed (75 MPa) from the 38 μm powder and sintered at 940° C. for times up to 60 minutes. Similar size specimens were cut from the 34 m diameter, 4 mm discs produced by hot pressing. These specimens were tested in three-point bending with a span-to-depth ratio of 4 and a cross-head speed of 1 mm/min. Prior to testing the tensile face was polished to a 6 μm finish and the edges bevelled.

The fracture toughness (critical stress intensity factor $K_{1c}$) of the hot pressed samples was determined from single-edge notch bend tests carried out at the same cross-head speed as employed for the strength measurements. The span-to-depth ratio was either 4 or 8, the notch-to-depth ratio 0.17 and the notch width 0.165 mm.

The fracture toughness of the materials produced by hot pressing was better than that obtained by cold pressing and firing. The lower toughness of the latter is due to the high volume fraction (4%) of relatively large pores. However, the toughness $K_{1c}$ of about 3 MNm$^{-3/2}$ acquired by hot pressing at 940° C. is also an improvement on the values of around 1.8–2.3 MNm$^{-3/2}$ reported for cast glass-ceramic of identical composition but made by melting, casting and heat-treatment, and containing negligible porosity. The toughness of cast glass-ceramic was relatively insensitive to the degree of diopside crystallisation in the range 58 to 82 vol% and to crystal size and morphology; therefore it would seem unlikely that the small crystal size and increased crystallinity of the 940° C. hot pressed material are solely responsible for the enhanced toughness. It is tentatively proposed that at least part of the improvement is attributable to the microporosity and to crack deflection (which has indeed been observed) due to the presence of anorthite.

The flexural strength of the hot pressed materials was approximately a factor of two better than that for the cold pressed and fired specimens and than that for the cast glass-ceramic.

Composites.

Three types of fiber composites were prepared by hot pressing a mixture of fibers and the powdered glass. The various fibers were: carbon fiber of 8 μm diameter (by Hercules), silicon carbide (SiC) fiber of 15 μm diameter ("Nicalon" by Nippon Carbon Co), and alumina fiber of 12 μm diameter (by Sumitomo). Aligned continuous fiber composites were produced with the fibers perpendicular to the direction of pressing. Although the three fibers differed in morphology and size distribution, efficient packing was obtained using powdered glass of less than 38 μm particle size.

The improvement in toughness which may accompany the incorporation of fibers in a glass-ceramic matrix is considered to be mainly the result of crack bowing and deflection, fiber debonding, fiber pull-out and fiber bridging (also known as wake toughening). These mechanisms are not independent as fiber pull-out and bridging cannot occur without debonding. Neither is their contribution to toughening equal; thus, for example, debonding is less significant than pull-out.

The effectiveness of some of these toughening mechanisms depends to a large extent on the bonding between the fiber and the matrix. If the bond is too strong the crack will tend to propagate almost unhindered through the fibers and the matrix. In contrast with weaker bonding the previously described toughening mechanisms of deflection, debonding and pull-out are operative.

The strength of the bond between the fiber and the glass-ceramic matrix is a function of the fiber type, the matrix composition and the temperature and time of hot pressing. Scanning electron fractographs demonstrated that the alumina fiber-matrix bond was strong for all conditions of the matrix. Consequently the alumina fibers caused only minor changes to the crack path and no significant debonding occurred. On the other hand the carbon fiber-glass-ceramic matrix and SiC fiber-glass-ceramic matrix combinations exhibited weak interfaces after appropriate hot-pressing schedules. These fiber-reinforced materials showed evidence of all the toughening mechanisms except perhaps for fiber bridging. Fiber pull-out was particularly apparent. Due to problems in applying linear elastic fracture mechanics to fiber-reinforced composites which have complex crack systems, e.g. multiple cracks, crack branching, etc., it is preferable to quantify toughness in terms of work of fracture rather than $K_{1c}$. The work of fracture of aligned, continuous SiC fiber reinforced glass-ceramic was determined from single-edge notched bend specimens as previously described for the determination of $K_{1c}$ for monolithic hot pressed samples. With volume fraction of fiber of 0.18±0.02 work of fracture values as high as 1.4 kJm$^{-2}$ were obtained compared with values for the monolithic glass-ceramic and for the sintered but fiberless matrix of less than 0.1 kJm$^{-2}$. The value of 1.4 kJm$^{-2}$ is not thought to be an upper limit as it is considered that improvements may be achieved by further optimisation of the hot pressing conditions and by increasing the volume fraction of fibers.

In the case of particle-reinforced glass-ceramic, the same range of possible materials for the dispersed phase can be used as for fibers (e.g. SiC, carbon, alumina) plus further materials unavailable, or not readily available, in fiber form (e.g. silicon nitride, spinel, zirconias). Particle-reinforced composites containing 20 volume % of spinel, zircon or 3 wt. % Yttria-stabilised zirconia have been produced by cold pressing and heat treating. The toughness measured by the indentation technique of the composites was in the range 1.7 to 2.4 MNm$^{-3/2}$ which is higher than the value of 1.5 MNm$^{-3/2}$ obtained for the sintered matrix material. The porosity content of these cold pressed particulate composites was high and an improvement in toughness would be expected on manufacturing by hot pressing.

We claim:

1. A method of making a ceramic material comprising a primary crystalline phase of diopside and about 5 to 30 weight % anorthite, said method comprising the steps of:

forming a homogeneous glass powder having a composition in parts by weight: CaO+MgO+Al$_2$O$_3$+SiO$_2$ totalling 100 in proportions (0–30):(0–30):(5–35):(35–75) respectively, plus ½–3 Cr$_2$O$_3$ or a precursor of Cr$_2$O$_3$ to yield ½–3 Cr$_2$O$_3$, plus ½–10 Fe$_2$O$_3$ or a precursor of Fe$_2$O$_3$ to yield ½–10 Fe$_2$O$_3$, and of a particle size not exceeding 70 μm; and heating the powder so as to sinter and crystallize it in the same heating.

2. A method according to claim 1, wherein the material comprises about 15 to 30 weight % anorthite.

3. A method according to claim 1, wherein the heating is conducted under pressure.

4. A method according to claim 1, wherein the particle size of the powder does not exceed 50 μm.

5. A method according to claim 2, wherein the powder is formed by making a melt of glass of said composition and cooling the melt rapidly enough for it to solidify as a glass, and comminuting the glass.

6. A method according to claim 5, wherein the comminuting is by granulating by pouring the melt into a quenching medium.

7. A method according to claim 5, wherein the comminuting is by crushing the cooled glass to the said particle size.

8. A method according to claim 1, further comprising mixing said crushed glass particles with a reinforcing phase, before the sintering.

9. A method according to claim 8, wherein the reinforcing phase is a ceramic.

10. A method according to claim 9, wherein the ceramic is in the form of particles or fibers.

11. A method according to claim 9, wherein the ceramic is selected from the group consisting of alumina, carbon, silicon carbide, silicon nitride, spinel and zirconia.

* * * * *